(12) United States Patent
Nikolaizig

(10) Patent No.: US 8,850,913 B2
(45) Date of Patent: Oct. 7, 2014

(54) MANUAL TRANSMISSION FOR A MOTOR VEHICLE

(71) Applicant: ZF Friedrichshafen AG, Friedrichshafen (DE)

(72) Inventor: Christian Nikolaizig, Werder/Havel (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/932,045

(22) Filed: Jul. 1, 2013

(65) Prior Publication Data

US 2014/0013880 A1 Jan. 16, 2014

(30) Foreign Application Priority Data

Jul. 16, 2012 (DE) .......................... 10 2012 212 370

(51) Int. Cl.
*F16H 3/08* (2006.01)
*F16H 3/091* (2006.01)

(52) U.S. Cl.
CPC .......... *F16H 3/08* (2013.01); *F16H 2200/0056* (2013.01); *F16H 2200/0091* (2013.01); *F16H 3/0915* (2013.01)
USPC .......................................................... 74/325

(58) Field of Classification Search
CPC . F16H 3/0915; F16H 3/091; F16H 200/0056; F16H 3/097; F16H 3/006; F16H 61/0403
USPC .............................. 74/325, 329, 335, 340, 331
See application file for complete search history.

(56) References Cited

U.S. PATENT DOCUMENTS

| 5,351,569 | A | * | 10/1994 | Trick et al. ....................... 74/329 |
| 6,012,345 | A | * | 1/2000 | Wafzig et al. ..................... 74/50 |
| 6,044,721 | A | * | 4/2000 | Genise ............................. 74/335 |
| 6,318,211 | B1 | | 11/2001 | Nitzschke et al. |

(Continued)

FOREIGN PATENT DOCUMENTS

| DE | 28 22 617 A1 | 11/1979 |
| DE | 197 53 061 C1 | 6/1999 |

(Continued)

OTHER PUBLICATIONS

German Search Report Corresponding to 10 2012 212 370.9 mailed Mar. 18, 2013.

*Primary Examiner* — Troy Chambers
*Assistant Examiner* — Jude Agendia
(74) *Attorney, Agent, or Firm* — Davis & Bujold, PLLC; Michael J. Bujold

(57) ABSTRACT

A manual transmission of a motor vehicle, is actuated by manually shifting a shift lever in a gearshift console having a selector gate and shifting gates in a multiple-H shifting pattern, with coaxial input and output shafts and a parallel countershaft, and with a number of gearset planes. Transmission gears are implemented by engaging at least two associated gear clutches. The gear clutches are divided into a selection group and a shifting group. The selection group gear clutches can be actuated exclusively by moving the shift lever in the selection gate so as to couple the input and counter-shafts. The shifting group gear clutches can be actuated exclusively by moving the shift lever in the shifting gates so as to couple the output and counter-shafts, and the gear clutch respectively engaged in the shifting gates having the two opposite gears is a selection group gear clutch.

11 Claims, 4 Drawing Sheets

(56) References Cited

U.S. PATENT DOCUMENTS

| | | | |
|---|---|---|---|
| 6,422,104 B2 * | 7/2002 | Kamiya | 74/335 |
| 6,718,841 B1 * | 4/2004 | Schepperle | 74/359 |
| 7,069,799 B2 * | 7/2006 | Wafzig | 74/329 |
| 7,798,937 B2 * | 9/2010 | Gitt | 475/302 |
| 8,051,735 B2 * | 11/2011 | Bender et al. | 74/335 |
| 8,561,493 B2 * | 10/2013 | Hoffmann | 74/330 |

FOREIGN PATENT DOCUMENTS

| | | |
|---|---|---|
| DE | 197 54 726 A1 | 6/1999 |
| DE | 101 14 557 A1 | 9/2002 |
| DE | 101 20 060 A1 | 10/2002 |
| DE | 10 2005 057 813 A1 | 6/2007 |
| DE | 10 2008 017 862 A1 | 10/2009 |
| DE | 10 2010 043 564 A1 | 5/2012 |
| WO | 2012/062533 A1 | 5/2012 |

* cited by examiner

Fig. 4

| Gear | Select. synchronizer | Shift. synchronizer |
|---|---|---|
| 1 | S1 | S4 |
| 2 | S1 | S5 |
| 3 | S2 | S5 |
| 4 | S2 | S6 |
| 5D | S3 | S4 |
| 6 | S3 | S5 |
| 7 | S3 | S6 |
| R1 | S1 | S7 |
| (R2) | S2 | S7 |
| (R3) | S3 | S7 |

Fig. 5

| | Gear | Selection synchronizer | Shifting synchronizer |
|---|---|---|---|
| Group 1 | 1, 2, R1 | S1 | S4, S6, S7 |
| Group 2 | 3, 4, (R2) | S2 | S5, S6, S7 |
| Group 3 | 5D, 6, 7, (R3) | S3 | S4, S5, S6, S7 |

Fig. 6

| | Gear | Selection synchronizer | Shifting synchronizer |
|---|---|---|---|
| Group 1 | 1, 2, R1 | S1 or S2 | S4, S5, S6, S7 |
| Group 2 | 3, 4D, (R2) | S3 | |
| Group 3 | 5, 6, 7, (R3) | S2 or S1 | |

MANUAL TRANSMISSION FOR A MOTOR VEHICLE

This application claims priority from German patent application serial no. 10 2012 212 370.9 filed Jul. 16, 2013.

FIELD OF THE INVENTION

The invention concerns a manual transmission for a motor vehicle.

BACKGROUND OF THE INVENTION

Manual transmissions of countershaft design and that can be actuated with manual shifting devices have long been in use in drive-trains of motor vehicles. In a conventional countershaft transmission loose wheels and fixed wheels, which mesh in pairs, are usually arranged in a number of gearset planes. In each case, the shifting of transmission gears is accomplished by opening a gear clutch of a gear that is engaged and closing a gear clutch of a target gear, whereby a rotationally fixed connection between a loose wheel and a gear shaft on which the loose wheel concerned is mounted to rotate is released, whereas another rotationally fixed connection between a loose wheel and a transmission shaft is formed. Before the formation of the force closure in the drive-train, the rotating components of the target gear that have to be engaged are synchronized. In order to save space and weight the gear clutches, i.e. the synchronizing devices or claw clutches of the shifting devices, are where possible formed as dual clutches such that two gear clutches or synchronizing devices at a time are arranged in shifting packets that can be actuated from both sides. The number of gears in such transmissions usually corresponds to the number of gearset planes.

To obtain more gears with a given number of gearset planes or, for a set number of gears, to produce a more compact and cost-saving structure with fewer gearset planes, it is already known to set up shifting logic systems in which, to produce the transmission gears, existing gearset planes and gear clutches are used more than one at a time. In such manual transmissions, due to the smaller number of components, to produce a force flow in the transmission when the gears are engaged in each case more than one gear clutch is closed or is kept closed.

The design of a manual shifting device for such a transmission is relatively complex, as shown for example by DE 10 2008 017 862 A1 from which an operating device for a 7-gear manual transmission with an H-type shifting pattern is known.

Thus, such transmissions are usually actuated by means of actuators which are controlled automatically by a control unit by virtue of a shifting program. But if such a compact manual transmission is to be operated by a driver as a manually shifted transmission with shift-lever actuation in a logical shift pattern, then in order to limit the design complexity it is appropriate to actuate at least part of the gearshift, i.e. in each case at least one of the gear clutches to be engaged for the gearshift, automatically with the help of an actuator.

When the shift lever is guided in the gearshift consoles of such a manual-shift device of an at least partially automated transmission, shift processes are initiated by actuator means and/or control elements of the transmission are operated manually. For this, gear clutches can be actuated both by shifting movements in the shifting gates of the gearshift console and also by selector movements in the selection gates of the gearshift console. This entails a correspondingly high level of complexity for the actuators and their control.

DE 10 2005 057 813 A1 describes a manual shift transmission with an input shaft, an output shaft arranged coaxially with and behind it, and a countershaft arranged with its axis parallel to these shafts. The transmission gears can be engaged in each case by closing more than one gear clutch. The transmission comprises five gearset planes for the production of six forward gears and one reverse gear, such that the fifth gear is designed as a direct gear and the sixth gear as an overdrive gear, i.e. a fast-driving gear. The third and fourth gearset planes consist in each case of two meshing loose wheels, the loose wheels on the countershaft side of the two gearset planes being firmly connected with one another. On the input shaft, the output shaft and the countershaft are arranged a total of seven gear clutches, arranged as three dual gear clutches and one single clutch. By suitable adaptation of the radial dimensions of the gear clutches, all the gear clutches can be mechanically actuated by way of a single shifting shaft or shifting roller.

DE 10 2010 043 564 A1 describes a manual shift transmission with a manual shifting device, which is designed as a group transmission. This transmission comprises an input shaft, an output shaft arranged coaxially with and behind it, and a countershaft arranged parallel to the shafts. With five gearset planes, six forward and one reverse gear can be obtained. The first two gearset planes act as a splitter group, wherein the second gearset plane is also active with the other gearset planes in a main group. Of the total of six gear clutches three are formed as dual clutches, and one of the dual clutches is connected to the input shaft while the other two dual clutches are connected to the output shaft. All the loose wheels are arranged on the input shaft and the output shaft, whereas all the fixed wheels are connected to the countershaft. The transmission can be shifted in an H-shifting pattern having a plurality of shifting gates and a selection gate orientated transversely thereto, such that when any gear is engaged, two of the gear clutches are in each case closed and in the shifting gates with two opposite gears in each case one of the gear clutches in the two gears is closed. Several of the gear clutches can be actuated both in the selection gates and also in one or more of the shifting gates. A comparable transmission is also known from DE 197 53 061 C1.

SUMMARY OF THE INVENTION

Against this background the purpose of the present invention is to introduce a compact manual transmission with which a comparatively large number of gears can be obtained, which can be actuated by means of a manual shifting device, which can be actuated in a manner that is simple in terms of both design and control technology, and which can be manufactured inexpensively.

The invention is based on the recognition that a manual transmission in which more than one gear clutch is engaged in each gear can be adapted to a manual shifting device, by designing a gearset with the gear clutches or synchronizers grouped into selection synchronizers and shifting synchronizers. This makes possible a shifting logic for shift actuation in a logical multiple-H shifting pattern in which some of the gear clutches, namely the selection synchronizers, need only a single actuator for automated shifting. For the remaining gear clutches, namely the shifting clutches, a relatively simple conventional manual or mechanical shifting device is sufficient.

Accordingly, the invention begins from a manual transmission of a motor vehicle, which can be actuated by means of a manual shifting device comprising a gearshift console with a selection gate in the form of a transverse slot and a number of shifting gates in the form of longitudinal slots for guiding a selector lever in a multiple-H shifting pattern, with an input shaft, with an output shaft arranged coaxially behind the input shaft and with a countershaft arranged axis-parallel to the two transmission shafts, wherein gearwheels are arranged in a number of gearset planes, the gearwheels being arranged as fixed wheels or loose wheels on the transmission shafts, respectively in a rotationally fixed manner or able to be connected rotationally fixed to the transmission shafts by means of gear clutches, such that the transmission gears can be engaged in each case by closing at least two of the gear clutches, and in which, in shifting gates having opposite gears, in each case one of the gear clutches in the two gears is engaged.

To achieve the stated objective the invention also provides that the gear clutches are divided into a selection group and a shifting group, such that the gear clutches of the selection group can be actuated exclusively by selection movements of the shift lever in the selection gates, whereby the input shaft can be coupled to the countershaft, and the gear clutches of the shifting group can be actuated exclusively by shifting movements of the shift lever in the shifting gates, whereby the output shaft can be coupled to the countershaft, and wherein the gear clutch engaged in the two respective gears in shifting gates having opposite gears is a gear clutch of the selection group.

In what follows, the gear clutches of the selection group are also referred to as selection synchronizers or simply as selection clutches, and the gear clutches of the shifting group are also referred to as shifting synchronizers or simply as shifting clutches. Preferably, all the gear clutches of the transmission are designed as synchronizing devices.

Furthermore, a dual clutch or dual synchronizer is understood to be a gear-shifting device in which two gear clutches or synchronizing devices are assembled in a shifting packet that can be actuated from both sides. A single clutch is correspondingly understood to be a single gear clutch or synchronizing device that can only be actuated from one side.

The functional grouping of the gear clutches enables a simple partial automation of a transmission that can be actuated in a multiple-H shifting pattern.

Thus, it can be provided that the gear clutches of the selection group can be engaged by shift lever movements actuated by external force and in an automated manner, so that just one controllable actuator is provided by means of which all the gear clutches of the selection group can be actuated.

Accordingly, only one actuator is needed for the automated part of the shift. The actuator is controlled for its actuation by an associated control unit, as soon as the latter detects by means of suitable sensors a selection movement of the shift lever for engaging the gear clutch concerned. A dual utilization of gear clutches by selection movements of the shift lever on the one hand and by shifting movements of the shift lever on the other hand, as is usual in known designs for compact transmissions, is avoided. This results in design and control-technological simplification of the operation of the transmission. The partially automated selection synchronization and manual shift synchronization of the transmission can thus be achieved relatively inexpensively.

A gearset of a transmission that conforms to the invention is designed such that those gear clutches which are or will be engaged in the gears by virtue of the selection movement of the shift lever, are not required in any of the shifting gates. Accordingly, to engage a gear, first of all a first gear clutch is engaged by a selection movement and then a second gear clutch is engaged in the appropriate shifting gate by means of the shifting movement. The gear clutch engaged in the shifting gate is correspondingly first opened when the gear is disengaged again. For a gearshift in a shifting gate into an opposite gear, there is no need for a repeated actuation of the gear clutch already previously engaged by the selection movement. For a gearshift in a shifting gate which ends in the selector gate, i.e. without an opposite gear or into another shifting gate, i.e. into a not-opposite gear, during the selection movement the appropriate gear clutches in the selector gate are automatically opened or engaged one after another, or they remain still engaged.

In this way the gear clutches of the selector group can be actuated by just one actuator in such manner that all the adjacent gearshifts can be carried out with the smallest possible number of shifting operations, and any conceivable gear intervals can be obtained.

In an embodiment of the invention, a gearset can be provided, in which six gearset planes for obtaining seven forward gears and at least one reverse gear are arranged, wherein all the loose wheels and all the gear clutches are arranged on the input shaft and the output shaft, wherein all the fixed wheels are arranged on the countershaft, wherein seven gear clutches are provided, which are in the form of three dual clutches and one single clutch, wherein one dual clutch and the single clutch form the selection group and are connected to the input shaft, whereas the other two dual clutches form the shifting group and are connected frictionally to the output shaft.

This gearset arrangement provides a 7-gear manually shifted transmission with a multiple-H shifting gate, which in a partially automated embodiment requires only one actuator for a selection synchronizer during the selection of the gears in the selection gate of the multiple-H shifting pattern. The gearset provides a 7-gear manually shifted transmission whose structure is more compact than a conventional 6-gear manual transmission. The arrangement of all the gear clutches on the input shaft and the output shaft gives the further advantage that loose component rattling, which can be produced by the drive engine due to non-uniform rotations in the transmission, is reduced.

In a shifting logic system of this 7-gear manually shifted transmission it can be provided that a first gear clutch of the selector group is associated with a first gear, a second gear and a first reverse gear, a second gear clutch of the selector group is associated with a third gear, a fourth gear and an optional second reverse gear, and a third gear clutch of the selector group is associated with a fifth gear, a sixth gear, a seventh gear and an optional third reverse gear.

This gives three groups of gears, each associated with just only the gear clutch of the selection group. The gear clutches of the shifting group, in contrast, are used more than once in two, or in all three gear groups. With this shifting logic the gear clutches of the selection group can be selected in such manner that they only have to be shifted if, starting from a middle shifting gate of a multiple-H shifting pattern, a selection movement to the right or to the left takes place. During the other selection movements, the engaged gear clutch of the selection group can remain engaged.

By virtue of this shifting logic, with which in the multiple-H shifting pattern a particular selection synchronizer is selected in a central position, any selection movement to the right of that position selects a particular second selection synchronizer and any selection movement to the left of that position selects a particular third selection synchronizer, so that one actuator is sufficient for controlling all three selection synchronizers provided in the embodiment of the gearset described.

Furthermore this enables the transmission to be operated with relatively few shifting operations, which increases the shifting comfort and reduces the shifting times.

The gradation or spread and the shifting logic of the transmission can be varied by exchanging individual gearset planes, in such manner, however, as to abide by the concept that during gear changes in the gear groups none of the selection synchronizers has to be shifted.

In particular it can be provided that a fifth gear can be engaged as a direct gear. The direct gear can be engaged by direct coupling of the input shaft to the output shaft by closing two of the gear clutches. The sixth and the seventh gears can then have overdrive gear ratios.

It is also possible that by closing the same two gear clutches, a fourth gear can be engaged as a direct gear, so that the fifth, sixth and seventh gears provide three overdrive gears. In this, the division into gear groups is retained.

Moreover it can be provided that the gear clutches of the shifting group can be shifted manually by the shifting movements. In that case, in comparison to a conventional manually shifted transmission, the shifting synchronizers can be controlled or engaged directly by the driver.

Basically, however, it is also possible for the gear clutches of the shifting group, i.e. the shifting synchronizers, to be engaged by the shift lever movements in an automated and auxiliary force actuated manner. Together with the automated control of the selection synchronizers this gives a manually shifted transmission that can be actuated by actuators in a completely automated manner. This also enables a connection of the manual shifting device to a so-termed shift-by-wire shifting system in which all shift lever movements are detected electronically and relayed to an electronic transmission control unit by way of signals transmitted via a data connection such as a data bus, the control unit then actuating the appropriate actuators. This entirely eliminates any need for a mechanical or hydraulic coupling of the manual shifting device to the transmission. Consequently the multiple-H shifting pattern, with which shifts of the individual gearshift devices are initiated in the selection gates and the shifting gates, can be produced comparatively simply and inexpensively with only one actuator for the selection synchronizers, as in the partially automated embodiment, and with a plurality of actuators for the shifting synchronizers.

BRIEF DESCRIPTION OF THE DRAWINGS

To clarify the invention further the description of a drawing illustrating an example embodiment is attached. The drawing shows.

DETAILED DESCRIPTION OF THE PREFERRED EMBODIMENTS

Figure 1:
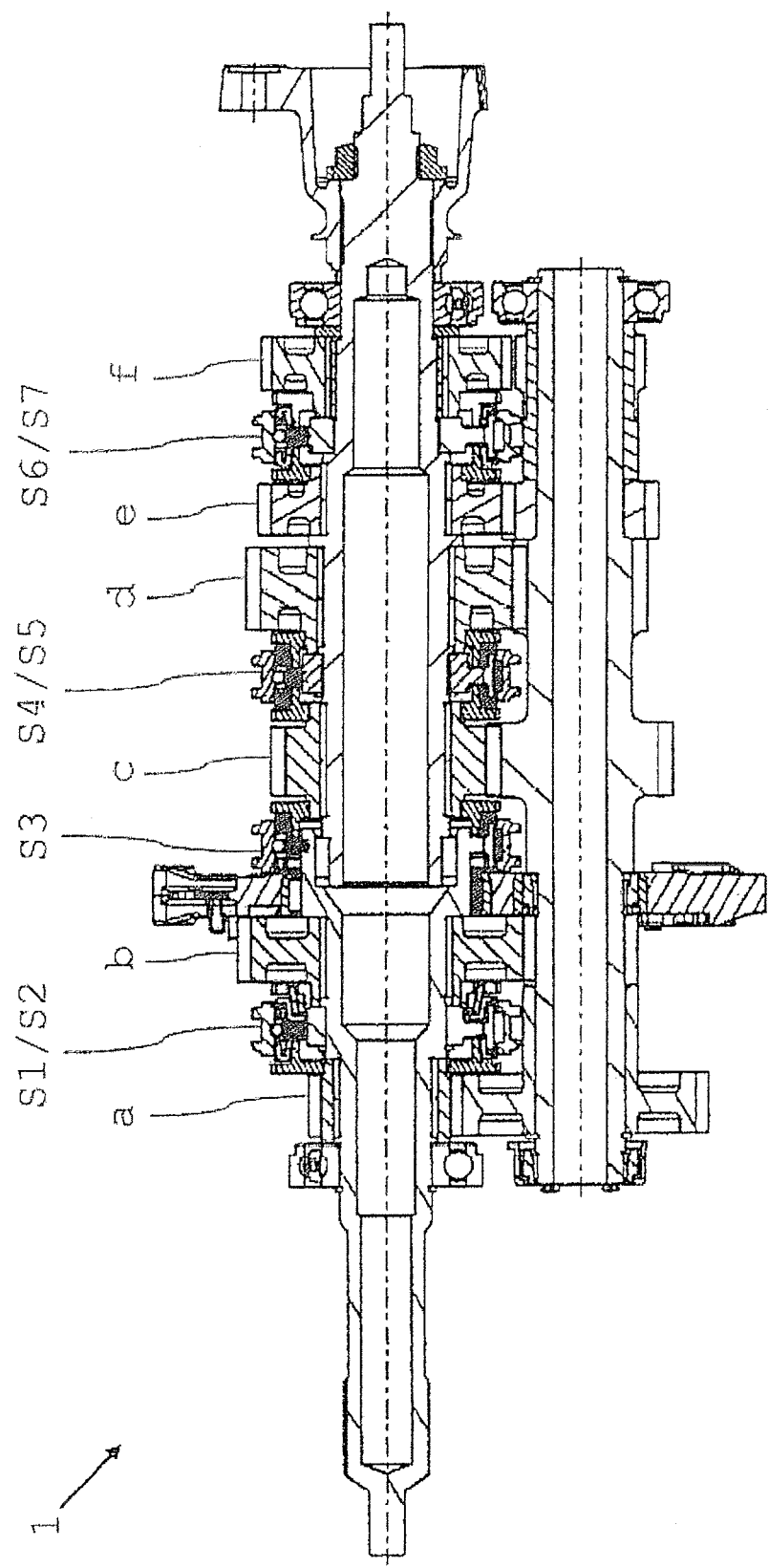
FIG. 1: A transmission according to the invention, shown in longitudinal section.

A manual transmission 1 is designed as a countershaft transmission with an input shaft 2 on the drive input side, an output shaft 3 on the drive output side arranged coaxially with and behind the input shaft, and a countershaft 4 with its axis parallel to the transmission shafts 2, 3.

The six gearset planes a to f are in each case in the form of meshing spur gear pairs $a1/a2$, $b1/b2$, $c1/c2$, $d1/d2$, $e1/e2$ and $f1/f2$, the last of these gearset planes f comprising in addition a rotatably mounted gearwheel f3 for reversing the rotational direction in order to obtain reversing gears. The spur gear pairs $a1/a2$, $b1/b2$, $c1/c2$, $d1/d2$, $e1/e2$ and $f1/f2$ in each case comprise a loose wheel $a1$, $b1$, $c1$, $d1$, $e1$, $f1$, which is mounted to rotate on the input shaft 2 or the output shaft 3 and can be connected in a rotationally fixed manner to the shafts 2, 3 by means of an associated gear clutch S1, S2, S3, S4, S5, S6, S7, as well as a fixed wheel $a2$, $b2$, $c2$, $d2$, $e2$, $f2$ connected in a rotationally fixed manner to the countershaft 4. The loose wheels $a1$, $b1$ of the first two gearset planes a, b are arranged on the input shaft 2 whereas the loose wheels $c1$, $d1$, $e1$, $f1$ of the rest of the gearset planes c, d, e, f are arranged on the output shaft 3.

The seven gear clutches S1, S2, S3, S4, S5, S6, S7 are designed as synchronizing devices and except for one gear clutch are assembled in each case into shifting packets that can be actuated from both sides. A first shifting packet S1/S2 on the input side is connected to the input shaft 2 and is arranged between the first and second gearset planes a, b. By means of this first dual synchronizer S1/S2, a rotationally fixed connection can be formed selectively between the loose wheel $a1$ of the first gearset plane a or the loose wheel $b1$ of the second gearset plane b and the input shaft 2.

Furthermore the gear clutch S3 is designed as a single synchronizing device and is connected rotationally fixed to the end of the input shaft 2 remote from the drive input. By means of this gear clutch S3, a rotationally fixed connection can be formed between the input shaft 2 and the adjacent loose wheel $c1$ of the third gearset plane c. In addition the loose wheel $c1$ can be connected rotationally fixed to the output shaft 3 by means of the adjacent gear clutch S4 of the second dual synchronizer S4/S5. Thus, the loose wheel $c1$ is the only loose wheel that has two gear clutches S3, S4 associated with it. By closing the two gear clutches S3, S4 a direct connection can be formed between the input shaft 2 and the output shaft 3, i.e. between the transmission input and the transmission output. The second and third gear clutches S4/S5 and S6/S7 formed in each case as dual synchronizers, selectively connect the other loose wheels $c1$ or $d1$ and $e1$ or $f1$ to the output shaft 3.

Thus the first three spur gear stages a, b, c can be coupled to the input shaft 2 by the first three gear clutches or synchronizers S1/S2, S3, and the third and fourth spur gear stages c, d and the fifth and sixth spur gear stages e, f by the fourth to the seventh gear clutches or synchronizers S4/S5 and S6/S7.

Figure 2:
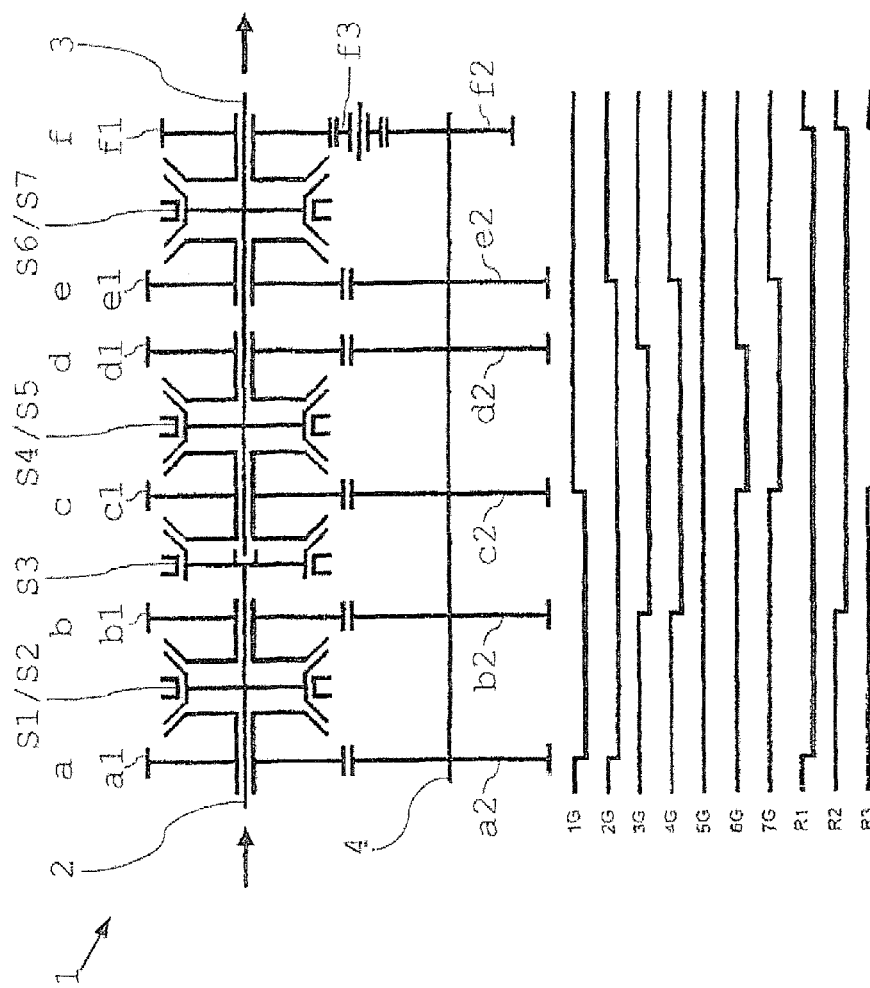
FIG. 2: A schematic representation of the transmission shown in FIG. 1, FIG. 3: A shifting pattern for a manually shifted device applicable to the transmission represented schematically in FIG. 2, FIG. 4: A tabulated shifting scheme, arranged according to gears, associated with the shifting pattern of FIG. 3, FIG. 5: A tabulated shifting scheme, arranged according to gear groups with a fifth gear as direct gear, associated with the shifting pattern of FIG. 3, and FIG. 6: A tabulated shifting scheme, arranged according to gear groups, with a fourth gear as direct gear.

The transmission 1 shown in FIGS. 1 and 2 provides seven forward gears 1G, 2G, 3G, 4G, 5G, 6G, 7G and up to three reverse gears R1, R2, R3. The force flow in the individual gears is indicated by a force-flow diagram shown in FIG. 2 under the transmission layout. The force flow lines are associated at their jump-points with the respective gearsets that are transmitting torque.

The shifting scheme for this transmission 1 can be seen in the table shown as FIG. 4. According to this, in each gear two of the gear clutches S1, S2, S3, S4, S5, S6, S7 are engaged, while a fifth gear 5G can be engaged as a direct gear. The two gears 6G, 7G higher than that are provided as overdrive gears.

Figure 3:
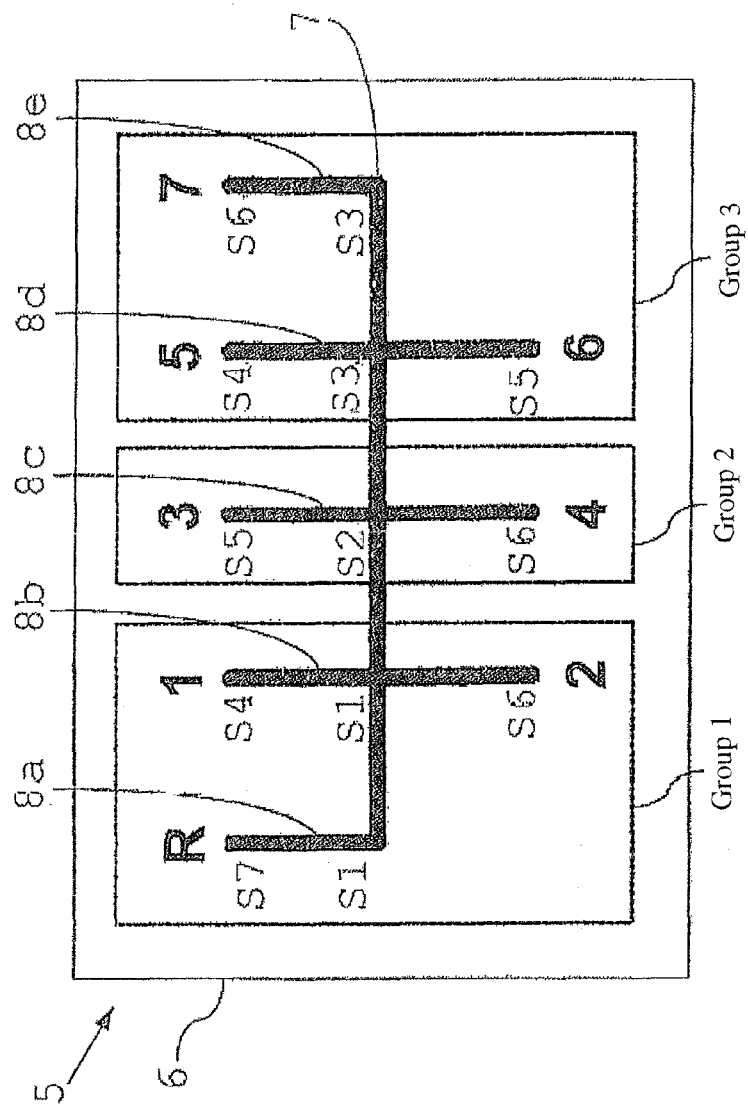

The shifting scheme in FIG. 4 can be applied with a manual shifting device for this transmission 1, which is illustrated in FIG. 3. According to this, to operate the transmission 1 in a multiple-H shifting pattern 5 a gearshift console gate 6 with a shift lever (not shown) that can be guided therein is provided, having five shifting gates 8*a*, 8*b*, 8*c*, 8*d* and 8*e* connected to one another by a selection gate 7 arranged perpendicularly thereto. The first shifting gate 8*a* is intended for a reverse gear R1 and the last shifting gate 8*e* for the highest, namely the seventh gear 7G. Between these are arranged three more shifting gates 8*b*, 8*c*, 8*d*, in which in each case two gears 1G/2G, 3G/4G, 5G/6G are positioned in a logical arrangement and in increasing sequence opposite one another.

The operation of the transmission by means of this manual shifting device takes place in two functional steps, a selection synchronization and a shifting synchronization.

For the selection synchronization the input shaft 2 is coupled to the countershaft 4 during a selection movement of the shift lever. The first three synchronizers S1, S2, S3 shown in FIG. 2 act as selection synchronizers. These are chosen such that they only have to be shifted when they are selected by moving to the right or left out of the middle shifting gate 8*c*, in which the third and fourth gears G3, G4 can be engaged. When changing gates between the first two shifting gates 8*a*, 8*b*, i.e. between the first two gears 1G, 2G and the reverse gear, and also when changing gates between the last two shifting gates 8*d* and 9*e*, i.e. between the fifth, sixth and seventh gears 5G, 6G, 7G, no actuation of the respective selection synchronizers S1, S3 is necessary. Likewise, no actuation of the selection synchronizer S2 is needed when changing gear in the middle gate 8*c*, i.e. between the third gear 3G and the fourth gear 4G.

Thus, there are three gear groups and each of these is associated with one selection synchronizer S1, S2, S3. These associations are indicated in the table constituting FIG. 5, from which it can be seen that within the gear groups the selection synchronizers S1, S2, S3 are in each case predetermined, whereas the shifting synchronizers S4, S5, S6 corresponding to the gears vary. The seventh synchronizer S7 is used for the reverse gear R. The possible additional reverse gears R2, R3 are not taken into account in the shifting pattern 5 shown in FIG. 3.

Consequently, all three selection synchronizers S1, S2 and S3 can be controlled with only one actuator. Correspondingly, for this part of the gearshift an actuator (not shown) is provided for automatic actuation of the appropriate shifting elements, which is controlled in accordance with the respective selection movements of the shift lever.

For the shifting synchronization that follows the selection synchronization, the output shaft 3 is coupled to the already synchronized unit comprising the countershaft 4 and the input shaft 2 during the shifting movement of the shift lever. The other synchronizers S4, S5, S6 and S7, which do not act as selection synchronizers, are provided as shifting synchronizers. The shifting synchronizers S4, S5, S6, S7 are actuated manually by the driver. Thus, the transmission 1 works as a partially automated manual shift transmission.

It should be mentioned that alternatively to the shifting scheme shown in FIGS. 2 to 5, in which a fifth gear 5G can be engaged as a direct gear, a shifting scheme with a fourth gear 4G as the direct gear 4D is possible. This is only indicated in the table forming FIG. 6, wherein three gear groups are again provided, each of them associated with a respective selection synchronizer S1, S2, S3, so that in the groups no selection synchronizer has to be shifted.

Accordingly, analogously to the first example embodiment, the third and fourth synchronizers S3, S4 produce the direct gear 4D. The selection synchronizer for a first gear group 1G, 2G, R can be the first or second synchronizer S1 or S2, while the selection synchronizer for a third gear group 5G, 6G. 7G can be the other of the first two synchronizers S1, S2. The shifting synchronizers S4, S5, S6, S7 can each be associated with these gear groups.

LIST OF INDEXES

1 Transmission
2 Input shaft
3 Output shaft
4 Countershaft
5 Shifting pattern
6 Gearshift console
7 Selection gate
8*a* Shifting gate
8*b* Shifting gate
8*c* Shifting gate
8*d* Shifting gate
8*e* Shifting gate
a Gearset plane
b Gearset plane
c Gearset plane
d Gearset plane
e Gearset plane
f Gearset plane
a1 Loose wheel
b1 Loose wheel
c1 Loose wheel
d1 Loose wheel
e1 Loose wheel
f1 Loose wheel
a2 Fixed wheel
b2 Fixed wheel
c2 Fixed wheel
d2 Fixed wheel
e2 Fixed wheel
f2 Fixed wheel
f3 Wheel for reversing the rotational direction
S1 Gear clutch, selection synchronizer
S2 Gear clutch, selection synchronizer
S3 Gear clutch, selection synchronizer
S4 Gear clutch, shifting synchronizer
S5 Gear clutch, shifting synchronizer
S6 Gear clutch, shifting synchronizer
S7 Gear clutch, shifting synchronizer
1G First gear
2G Second gear
3G Third gear
4G Fourth gear
5G Fifth gear
6G Sixth gear
7G Seventh gear
R1 First reverse gear
R2 Second reverse gear
R3 Third reverse gear

The invention claimed is:

1. A manual transmission (1) of a motor vehicle which is actuatable by a manual shifting device, the manual transmission (1) comprising:
 a gearshift console (6) with a selection gate (7) in the form of a transverse slot and a plurality of shifting gates (8*a*, 8*b*, 8*c*, 8*d*, 8*e*) in the form of longitudinal slots for guiding a shift lever in a multiple-H shifting pattern (5);
 an input shaft (2);
 an output shaft (3) arranged coaxially with and behind the input shaft (2);
 a countershaft (4) arranged with an axis thereof extending parallel to the input and the output shafts (2, 3);

gearwheels arranged in a number of gearset planes (a, b, c, d, e, f), which comprise fixed wheels (a2, b2, c2, d2, e2, f2) or loose wheels (a1, b1, c1, d1, e1, f1) arranged on the input shaft, the output shaft and the countershaft (2, 3, 4) or able to be coupled, in a rotationally fixed manner, to the input shaft, the output shaft and the countershaft (2, 3, 4) by gear clutches (S1, S2, S3, S4, S5, S6, S7);

transmission gears being engaged by engagement, in each case, of at least two of the gear clutches (S1, S2, S3, S4, S5, S6, S7), the shifting gates (8b, 8c, 8d) that have opposite gears, in each case, one of the gear clutches (S1, S2, S3) is engaged in the two opposite gears, the gear clutches (S1, S2, S3, S4, S5, S6, S7) are divided into a selection group and a shifting group, such that:
the gear clutches (S1, S2, S3) of the selection group are exclusively actuatable by selection movements of the shift lever in the selection gate (7) so that the input shaft (2) is coupled to the countershaft (4), and
the gear clutches (S4, S5, S6, S7) of the shifting group are exclusively actuatable by shifting movements of the shift lever in the shifting gates (8a, 8b, 8c, 8d, 8e) so that the output shaft (3) is coupled to the countershaft (4), and the gear clutch (S1, S2, S3) respectively engaged in the two opposite gears in the shifting gates (8b, 8c, 8d) that have opposite gears is a gear clutch of the selection group wherein six gearset planes (a, b, c, d, e, f) are arranged so as to produce seven forward gears (1G, 2G, 3G, 4G, 5G, 6G, 7G) and at least one reverse gear (R1), all the loose wheels (a1, b1, c1, d1, e1, f1) and all the gear clutches (S1, S2, S3, S4, S5, S6, S7) are arranged on the input shaft (2) and the output shaft (3) and all the fixed wheels (a2, b2, c2, d2, e2, f2) are arranged on the countershaft (4).

2. The transmission according to claim 1, wherein the gear clutches (S1, S2, S3) of the selection group are shifted automatically by the shift lever movements, and just one controllable actuator is provided, by which all the gear clutches (S1, S2, S3) of the selection group are actuatable.

3. The transmission according to claim 1, wherein six gearset planes (a, b, c, d, e, f) are arranged so as to produce seven forward gears (1G, 2G, 3G, 4G, 5G, 6G, 7G) and at least one reverse gear (R1), all the loose wheels (a1, b1, c1, d1, e1, f1) and all the gear clutches (S1, S2, S3, S4, S5, S6, S7) are arranged on the input shaft (2) and the output shaft (3) and all the fixed wheels (a2, b2, c2, d2, e2, f2) are arranged on the countershaft (4),
seven gear clutches (S1, S2, S3, S4, S5, S6, S7) are provided which are in the form of three double clutches (S1/S2, S4/S5, S6/S7) and one single clutch (S3), such that one double clutch (S1/S2) and the single clutch (S3) form the selection group and are frictionally connected to the input shaft (2), and the other two double clutches (S4/S5, S6/S7) form the shifting group and are frictionally connected to the output shaft (3).

4. The transmission according to claim 1, wherein a fifth gear (5G) is engagable as a direct gear (5D).

5. The transmission according to claim 1, wherein a fourth gear (4G) is engagable as a direct gear (4D).

6. The transmission according to claim 1, wherein the gear clutches (S4, S5, S6, S7) of the shifting group are manually shiftable by the shift lever movement.

7. The transmission according to claim 1, wherein the gear clutches (S4, S5, S6, S7) of the shifting group are automatically shiftable and with auxiliary force actuation by the shift lever movement.

8. The transmission according to claim 1, wherein the gearshift console (6) comprises a single elongate selection gate (7) and five associated shift gates (8a, 8b, 8c, 8d, 8e).

9. The transmission according to claim 1, wherein a third gear wheel supported by the input shaft, located closest to the output shaft, is clutch connectable to both the input shaft and the output shaft.

10. A manual transmission (1) of a motor vehicle which is actuatable by a manual shifting device, the manual transmission (1) comprising:
a gearshift console (6) with a selection gate (7) in the form of a transverse slot and a plurality of shifting gates (8a, 8b, 8c, 8d, 8e) in the form of longitudinal slots for guiding a shift lever in a multiple-H shifting a pattern (5);
an input shaft (2);
an output shaft (3) arranged coaxially with and behind the input shaft (2);
a countershaft (4) defining a rotational axis and arranged with the rotational axis extending parallel to the input and the output shafts (2, 3);
gearwheels arranged in a number of gearset planes (a, b, c, d, e, f), which comprise fixed wheels (a2, b2, c2, d2, e2, f2) or loose wheels (a1, b1, c1, d1, e1, f1) arranged on the input shaft, the output shaft and the countershaft (2, 3, 4) or able to be coupled, in a rotationally fixed manner, to the input shaft, the output shaft and the countershaft (2, 3, 4) by gear clutches (S1, S2, S3, S4, S5, S6, S7);
transmission gears being engaged by engagement, in each case, of at least two of the gear clutches (S1, S2, S3, S4, S5, S6, S7);
the shifting gates (8b, 8c, 8d) that have opposite gears, in each case, one of the gear clutches (S1, S2, S3) is engaged in the two gears;
the gear clutches (S1, S2, S3, S4, S5, S6, S7) are divided into a selection group and a shifting group, such that the gear clutches (S1, S2, S3) of the selection group are actuatable exclusively by selection movements of the shift lever within the selection gate (7), whereby the input shaft (2) is coupled to the countershaft (4); and
the gear clutches (S4, S5, S6, S7) of the shifting group are actuatable exclusively by shifting movements of the shift lever within the shifting gates (8a, 8b, 8c, 8d, 8e), whereby the output shaft (3) is coupled to the countershaft (4);
the gear clutch (S1, S2, S3) respectively engaged in the two gears in the shifting gates (8b, 8c, 8d) that have opposite gears is a gear clutch of the selection group;
six gearset planes (a, b, c, d, e, f) are arranged so as to produce seven forward gears (1G, 2G, 3G, 4G, 5G, 6G, 7G) and at least one reverse gear (R1), all the loose wheels (a1, b1, c1, d1, e1, f1) and all the gear clutches (S1, S2, S3, S4, S5, S6, S7) are arranged on the input shaft (2) and the output shaft (3) and all the fixed wheels (a2, b2, c2, d2, e2, f2) are arranged on the countershaft (4);
seven gear clutches (S1, S2, S3, S4, S5, S6, S7) are provided which are in the form of three double clutches (S1/S2, S4/S5, S6/S7) and one single clutch (S3), such that one of the three double clutches (S1/S2) and the single clutch (S3) form the selection group and are frictionally connected to the input shaft (2), and the other two double clutches (S4/S5, S6/S7) form the shifting group and are frictionally connected to the output shaft (3);

a first gear clutch (S1) of the selection group is associated with a first gear (1G), a second gear (2G) and a first reverse gear (R1), a second gear clutch (S2) of the selection group (S2) is associated with a third gear (3G), a fourth gear (4G) and can be associated with second reverse gear (R2), and a third gear clutch (S3) of the selection group is associated with a fifth gear (5G), a sixth gear (6G), a seventh gear (7G) and can be associated with third reverse gear (R3).

11. A manual transmission (1) of a motor vehicle, the manual transmission (1) comprising:

a manual shifting device comprising a gearshift console (6) having a selection gate (7) formed as a transverse slot in the gearshift console and first, second, third, fourth and fifth shifting gates (8a, 8b, 8c, 8d, 8e) formed as longitudinal slots in the gearshift console, the selection gate and the first, the second, the third, the fourth and the fifth shifting gates are arranged in a multiple-H shifting pattern (5) so as to guide a shift lever which is manually actuated for shifting between a plurality of transmission gears;

an input shaft (2);

an output shaft (3) coaxially aligned with and behind the input shaft (2) with respect to a direction of force flow, a countershaft (4) arranged parallel to the input and the output shafts (2, 3);

a plurality of gearset planes (a, b, c, d, e, f) comprising a plurality of fixed wheels (a2, b2, c2, d2, e2, f2) and a plurality of loose wheels (a1, b1, c1, d1, e1, f1), each of the plurality of fixed wheels is continuously fixed to one of the input shaft, the output shaft and the countershaft, and each of the plurality of the loose wheels is connectable, in a rotationally fixed manner, to one of the input shaft, the output shaft and the countershaft by at least one of a first, a second, a third, a fourth, a fifth, and a sixth gear clutches (S1, S2, S3, S4, S5, S6, S7);

the first, the second and the third gear clutches form a selection group and are respectively engaged by movement of the shift lever along the selection gate and couple the input shaft to the countershaft;

the fourth, the fifth, and the sixth gear clutches form a shifting group and are respectively engaged by movement of the shift lever along a respective one of the first, the second, the third, the fourth and the fifth shifting gates to couple the output shaft (3) to the countershaft (4);

each of the plurality of transmission gears is implemented by selective engagement of at least one of the first, the second, the third, and at least one of the fourth, the fifth, and the sixth gear clutches (S1, S2, S3, S4, S5, S6, S7);

each of the second, the third and the fourth shifting gates (8b, 8c, 8d) corresponds to, respectively, two of the plurality of transmission gears, the first gear clutch is engaged for both of the transmission gears corresponding to the second shift gate, the second gear clutch is engaged for both of the transmission gears corresponding to the third shift gate and the third gear clutch is engaged for both of the transmission gears corresponding to the fourth shift gate wherein six gearset planes (a, b, c, d, e, f) are arranged so as to produce seven forward gears (1G, 2G, 3G, 4G, 5G, 6G, 7G) and at least one reverse gear (R1), all the loose wheels (a1, b1, c1, d1, e1, f1) and all the gear clutches (S1, S2, S3, S4, S5, S6, S7) are arranged on the input shaft (2) and the output shaft (3) and all the fixed wheels (a2, b2, c2, d2, e2, f2) are arranged on the countershaft (4).

* * * * *